United States Patent
Miller et al.

(10) Patent No.: US 10,427,082 B2
(45) Date of Patent: Oct. 1, 2019

(54) FILTER SYSTEMS, ELEMENTS AND METHODS WITH SHORT-RANGE WIRELESS TRACKING FEATURES

(71) Applicant: Donaldson Company, Inc., Minneapolis, MN (US)

(72) Inventors: Danny William Miller, Ackley, IA (US); Daniel E. Adamek, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 16/102,277

(22) Filed: Aug. 13, 2018

(65) Prior Publication Data

US 2019/0054411 A1 Feb. 21, 2019

Related U.S. Application Data

(60) Provisional application No. 62/546,246, filed on Aug. 16, 2017.

(51) Int. Cl.
*H04B 5/00* (2006.01)
*B01D 46/42* (2006.01)
(Continued)

(52) U.S. Cl.
CPC ........... *B01D 46/429* (2013.01); *B01D 27/08* (2013.01); *B01D 29/01* (2013.01); *B01D 29/111* (2013.01);
(Continued)

(58) Field of Classification Search
CPC ....... B01D 46/429; B01D 27/08; H04W 4/80; H04W 4/023
(Continued)

(56) References Cited

U.S. PATENT DOCUMENTS 4,350,504 A 9/1982 Diachuk
5,121,599 A 6/1992 Snyder et al.
(Continued)

FOREIGN PATENT DOCUMENTS

CN 104801099 6/2015
DE 102013004112 9/2014
(Continued)

OTHER PUBLICATIONS

"International Search Report and Written Opinion," for PCT Application No. PCT/US2018/046810 dated Nov. 16, 2018 (19 pages).

*Primary Examiner* — Md K Talukder
(74) *Attorney, Agent, or Firm* — Pauly, DeVries Smith & Deffner LLC

(57) ABSTRACT

Aspects herein include filter systems including short-range wireless tracking features to detect insertion and/or removal of filter elements from filter systems. In an embodiment, a filtration system is included having a housing including a fluid inlet and a fluid outlet. The housing can define an internal volume. A first filter element can be removably disposed within the housing. A short-range wireless communication tag can be associated with the first filter element. A short-range wireless communication reader can be associated with the housing, the reader configured to wirelessly send data to and receive data from the tag when the reader and the tag are at a distance that is less than or equal to a maximum communication distance. Removal of the first filter element from the housing can cause the distance between the tag and the reader to exceed the maximum communication distance. Other embodiments are also included herein.

26 Claims, 12 Drawing Sheets

(51) Int. Cl.
   *H04W 4/80*    (2018.01)
   *B01D 27/08*   (2006.01)
   *H04W 4/02*    (2018.01)
   *B01D 35/143*  (2006.01)
   *B01D 46/00*   (2006.01)
   *B01D 29/01*   (2006.01)
   *B01D 29/11*   (2006.01)
   *B01D 29/58*   (2006.01)

(52) U.S. Cl.
   CPC ............ *B01D 29/114* (2013.01); *B01D 29/58* (2013.01); *B01D 35/143* (2013.01); *B01D 46/009* (2013.01); *H04W 4/023* (2013.01); *H04W 4/80* (2018.02); *B01D 2201/291* (2013.01); *B01D 2201/302* (2013.01); *B01D 2201/52* (2013.01); *B01D 2201/56* (2013.01); *B01D 2265/026* (2013.01)

(58) Field of Classification Search
   USPC ...................................... 455/41.1, 41.2, 41.3
   See application file for complete search history.

(56) References Cited

U.S. PATENT DOCUMENTS

| | | | |
|---|---|---|---|
| 6,051,144 A | 4/2000 | Clack et al. | |
| 6,551,503 B2 | 4/2003 | Niers et al. | |
| 6,652,614 B2 | 11/2003 | Gieseke et al. | |
| 6,936,160 B2 | 8/2005 | Moscaritolo et al. | |
| 7,052,525 B2 | 5/2006 | Kang et al. | |
| 7,901,570 B2 | 3/2011 | Grzonka et al. | |
| 8,029,679 B2 | 10/2011 | Grzonka et al. | |
| 8,336,292 B2 | 12/2012 | Bloms et al. | |
| 9,541,429 B2 | 1/2017 | Farokhi et al. | |
| 2004/0079693 A1 | 4/2004 | Hacker et al. | |
| 2005/0150304 A1 | 7/2005 | Gustafson et al. | |
| 2009/0064774 A1* | 3/2009 | Panzer | F16D 21/06 73/115.04 |
| 2010/0115920 A1 | 5/2010 | Bloms et al. | |
| 2010/0247426 A1* | 9/2010 | Wallace | B01J 7/02 423/648.1 |
| 2011/0062060 A1 | 3/2011 | Royal et al. | |
| 2012/0132573 A1* | 5/2012 | Lautzenheiser | C02F 1/008 210/85 |
| 2013/0216673 A1* | 8/2013 | Storek | A47J 27/62 426/509 |
| 2013/0220900 A1 | 8/2013 | Milvert et al. | |
| 2013/0251626 A1* | 9/2013 | Wallace | C01B 3/06 423/657 |
| 2014/0260989 A1 | 9/2014 | Sukhman et al. | |
| 2015/0290572 A1 | 10/2015 | Stoner, Jr. et al. | |
| 2015/0369717 A1 | 12/2015 | Twiss | |
| 2016/0045854 A1 | 2/2016 | Hung et al. | |
| 2016/0046502 A1 | 2/2016 | Rice | |
| 2017/0050130 A1* | 2/2017 | Bippus | F25D 23/126 |
| 2017/0050139 A1 | 2/2017 | Schrage et al. | |
| 2017/0080363 A1* | 3/2017 | Krause | B01D 35/143 |
| 2018/0117508 A1* | 5/2018 | Paluszewski | B01D 35/143 |
| 2018/0172661 A1* | 6/2018 | Spengler | G01N 11/00 |
| 2018/0186655 A1* | 7/2018 | Cobb | E03C 1/0411 |

FOREIGN PATENT DOCUMENTS

| | | |
|---|---|---|
| EP | 1830173 | 9/2007 |
| EP | 3029388 | 6/2016 |
| EP | 3315183 | 5/2018 |
| WO | 2009033923 | 3/2009 |
| WO | 2015002307 | 1/2015 |
| WO | 2016011580 | 1/2016 |
| WO | 2016096786 | 6/2016 |
| WO | 2017192729 | 11/2017 |

* cited by examiner

FILTER SYSTEMS, ELEMENTS AND METHODS WITH SHORT-RANGE WIRELESS TRACKING FEATURES

This application claims the benefit of U.S. Provisional Application No. 62/546,246, filed Aug. 16, 2017, the contents of which are herein incorporated by reference in their entireties.

FIELD

Embodiments herein relate to filter systems including short-range wireless tracking features. More specifically, embodiments herein relate to filter systems including short-range wireless tracking features that can detect actions regarding the filter system such as cover removal, latch actuation, insertion and/or removal of filter elements from filter systems and the like.

BACKGROUND

Fluid streams often carry particulate material therein. In many instances, it is desirable to remove some or all of the particulate material from a fluid flow stream. For example, air intake streams to engines for motorized vehicles or power generation equipment, gas streams directed to gas turbines, and air streams to various combustion furnaces, often include particulate material therein. The particulate material, should it reach the internal workings of the various mechanisms involved, can cause substantial damage thereto. It is therefore preferred, for such systems, to remove the particulate material from the fluid flow upstream of the engine, turbine, furnace or other equipment involved. A variety of air filter or gas filter arrangements have been developed for particulate removal. Beyond particulate removal, filter systems can also be used as gas phase or liquid phase contaminant removal systems.

Many filter systems include filter elements that must be replaced and/or serviced at intervals in order to assure proper operation.

SUMMARY

Embodiments include filter systems including short-range wireless tracking features that can detect insertion and/or removal of filter elements from filter systems. In an embodiment, a filtration system is included having a housing. The housing can include a fluid inlet and a fluid outlet. The housing can define an internal volume. A first filter element can be configured to be removably disposed within the housing. A short-range wireless tag can be associated with the first filter element. A short-range wireless reader associated with or outside of the housing, the short-range wireless reader configured to wirelessly send data to and receive data from the short-range wireless tag when the short-range wireless reader and the short-range wireless tag are at a distance that is less than or equal to a maximum communication distance. Removal of the first filter element from the housing can cause movement of the short-range wireless tag away from the short-range wireless reader by an amount that causes the distance between the short-range wireless tag and the short-range wireless reader to exceed the maximum communication distance.

In an embodiment, a filtration system is included having a housing. The housing can include a fluid inlet and a fluid outlet. The housing can define an internal volume. A first filter element can be configured to be removably disposed within the housing. A short-range wireless communication tag can be associated with the first filter element. A short-range wireless communication reader can be associated with, or outside of, the housing. The reader can be configured to wirelessly send data to and receive data from the tag when the reader and the tag are at a distance that is less than or equal to a maximum communication distance. Removal of the first filter element from the housing can cause movement of the tag away from the reader by an amount that causes the distance between the tag and the reader to exceed the maximum communication distance.

In an embodiment, a method of detecting filter element removal events in a filtration system is included. The method can include inductively transmitting power from a short-range wireless communication reader to a short-range wireless communication tag, the reader associated with or outside of a filter housing. The filter housing can include a fluid inlet and a fluid outlet. The filter housing can define an internal volume. The short-range wireless communication tag can be associated with a first filter element. The first filter element can be configured to be removably disposed within the housing. The method can include receiving a wireless signal produced by the tag with the reader. The method can also include detecting occurrences of non-communication between the reader and the tag, wherein an occurrence of non-communication following a previous phase of communication is indicative of a filter element removal event.

In an embodiment, a filtration system is included. The filtration system can include a spin-on canister filter, a short-range wireless communication tag associated with the spin-on canister filter, a filter head configured to receive the spin-on canister filter, and a short-range wireless communication reader associated with the filter head. The short-range wireless communication reader can be configured to wirelessly send data to, and receive data from, the short-range wireless communication tag when the short-range wireless communication reader and the short-range wireless communication tag are at a distance that is less than or equal to a maximum communication distance. Removal of the spin-on canister filter from the filter head causes movement of the short-range wireless communication tag away from the short-range wireless communication reader by an amount that causes the distance between the short-range wireless communication tag and the short-range wireless communication reader to exceed the maximum communication distance.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following drawings, in which.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

Embodiments herein can include the use of short-range wireless communication components such as tags and readers placed onto filter elements and the housings into which they fit. The tags and readers can be arranged such that removal of the filter elements therefrom causes the tag and the associated reader to be separated by a distance that exceeds the operating wireless communication distance of the pair. As such, removal of the filter elements from the housings into which they fit can be determined based on sensing an absence in communication between the wireless tag and the associated wireless reader.

Figure 1:
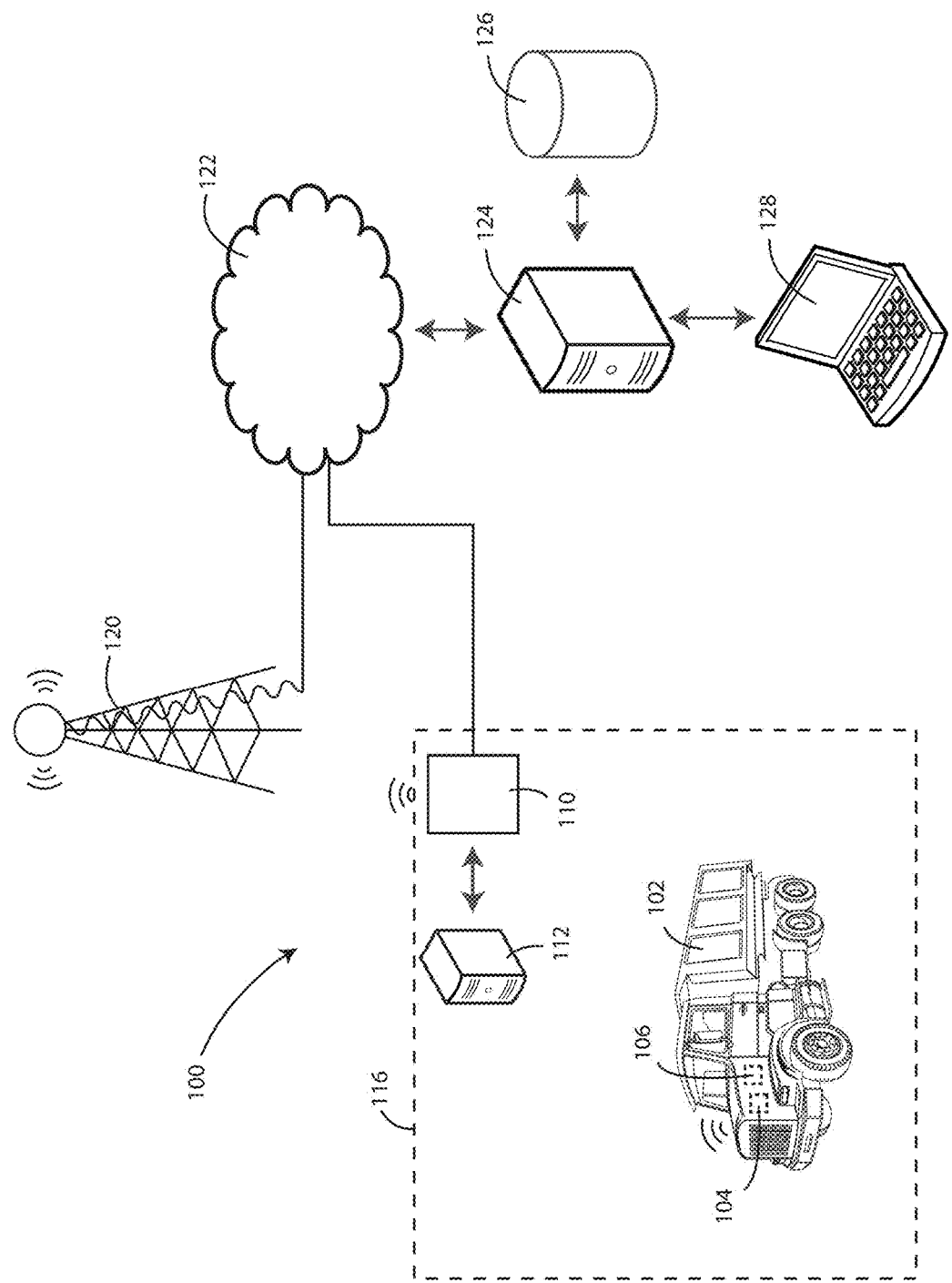
FIG. 1 is a schematic view of a filter system data communication environment 100.

Referring now to FIG. 1, a schematic view of a filter system data communication environment 100 is shown. A machine 102, such as a vehicle, can include an engine control unit 104 (ECU) and a filter system 106. The filter system 106 can be for various purposes including, but not limited to, filtering fluids such as incoming air, fuel, lubricating oils, or exhaust gases. In some embodiments, the machine 102 includes multiple filter systems. Exemplary filter systems are described in greater detail below.

In some embodiments, the filter system 106 can be in electronic communication with the ECU 104 in either a wired or wireless manner. In some embodiments, the filter system 106 can emit and/or receive wireless signals to or from components that are external to the machine 102 or vehicle, either bypassing the ECU 104 or in parallel with wired or wireless signals exchanged with the ECU 104.

The machine 102 can be within a work environment 116. The work environment 116 can represent a geographic area in which the machine 102 primarily operates. Depending on the nature of the machine 102, the work environment 116 could be quite large (10s to 1000s of square miles) or relatively small (less than 10 or even 1 square mile). The work environment 116 can be, for example, a mining facility, a construction site, a shipping or distribution center, a production facility, or the like. In some embodiments, a gateway or repeater unit 110 can be disposed within the work environment 116. The gateway or repeater unit 110 can, in some embodiments, communicate wirelessly with the machine 102 and/or components thereof such as the filter system 106 and/or the ECU 104. In some embodiments, the gateway or repeater unit 110 can be connected to an external data network 122, such as the Internet or various private networks. In some embodiments, the data network 122 can be a packet-switched network. In some embodiments, the gateway or repeater 110 can also include data network router functionality.

In some embodiments, a server 112 can also be disposed in the work environment 116. The server 112 can receive data from the gateway or repeater unit 110. It will be appreciated, however, that in many embodiments there may not be a server 112 in the work environment 116.

In some embodiments, wireless signals from one or more of the components such as the machine 102, ECU 104, filter system 106, gateway or repeater unit 110, can be exchanged with a wireless communication tower 120 (or antenna array), which could be a cellular tower or other wireless communication tower. The wireless communication tower 120 can be connected to a data network 122, such as the Internet or another type of public or private data network, packet-switched or otherwise.

The data network can provide for one-way or two-way communication with other components that are external to the work environment 116. For example, a server 124 or other processing device can receive electronic signals containing data from one or more components such as the machine 102, ECU 104, filter system 106, gateway or repeater unit 110, or the like. The server 124 can interface with a database 126 to store data. In some embodiments, the server 124 (or a particular device that is part of the server system) can interface with a user device 128, which can allow a user to query data stored in the database 126.

Data produced by the filter system 106 can be of various types. In some embodiments, data produced by the filter system 106 can include data regarding pressure drop, pressure drop change over time, primary filter removal events and/or counts of same, secondary filter removal events and/or counts of same, primary filter hours of usage, secondary filter hours of usage, primary filter installation dates and times and/or counts of installation events, secondary filter installation dates and times and/or counts of installation events, and the like.

Figure 2:
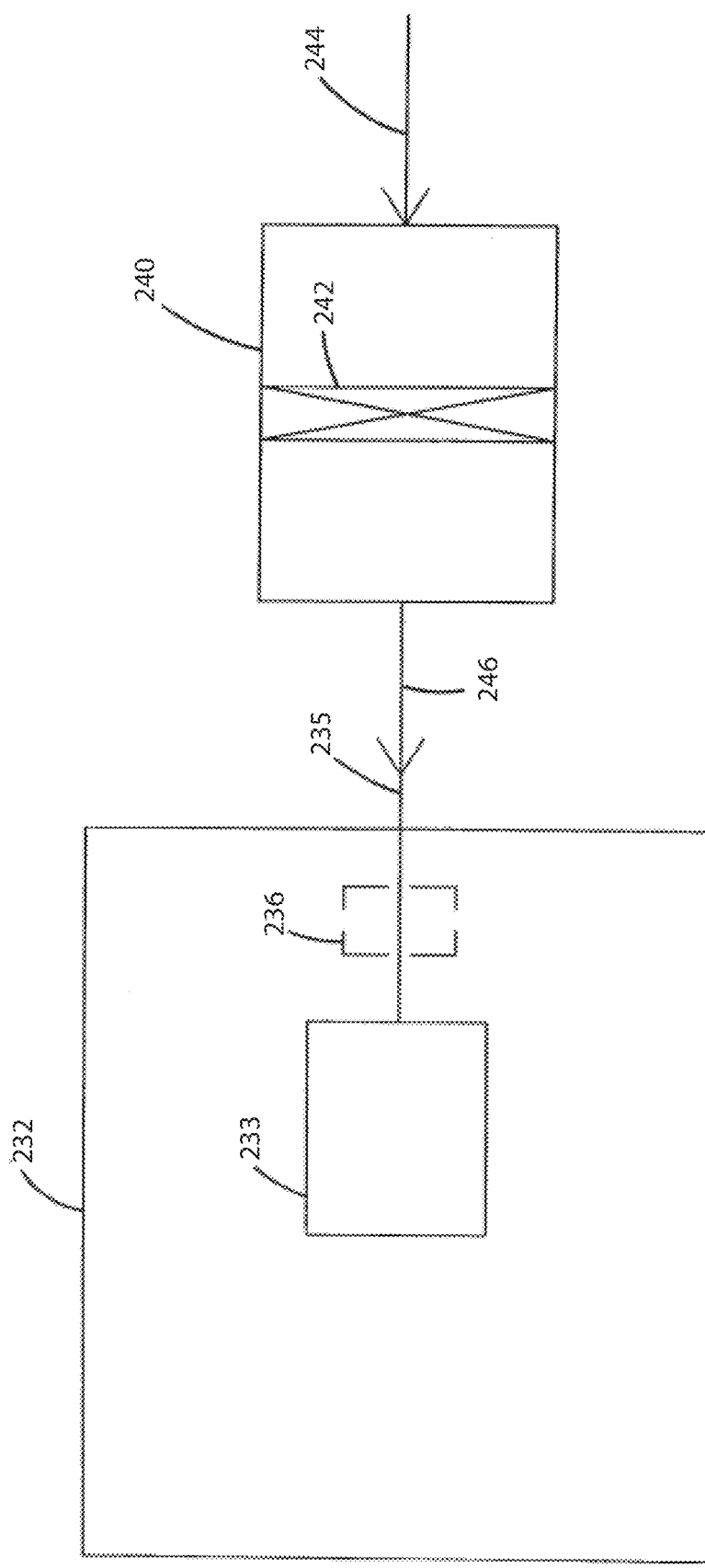
FIG. 2 is a schematic view of an embodiment of a system in which filter systems according to the present disclosure are used.

Referring now to FIG. 2, a schematic view is shown of an embodiment of a system in which filter systems according to the present disclosure are used. In FIG. 2, equipment 232, such as a vehicle, having an engine 233 with some defined rated air flow demand, for example at least 50 cfm and up to 1800 cfm, is shown schematically. The equipment 232 may be a bus, an over-the-highway truck, an off-road vehicle, a tractor, a light-duty or medium duty truck, or a marine application such as a powerboat. The engine 233 powers the equipment 232, through use of an air and fuel mixture. In FIG. 2, air flow is shown drawn into the engine 233 at an intake region 235. An optional turbo 236 is shown in phantom, as optionally boosting the air intake into the engine 233. A filter system 240 having a filter construction 242 is upstream of the engine 233 and the turbo 236. In general, in operation, air is drawn in at arrow 244 into the filter system 240 and through the filter construction 242. There, particles and contaminants are removed from the air. The cleaned air flows downstream at arrow 246 into the intake 235. From there, the air flows into the engine 233 to power the equipment 232.

Figure 3:
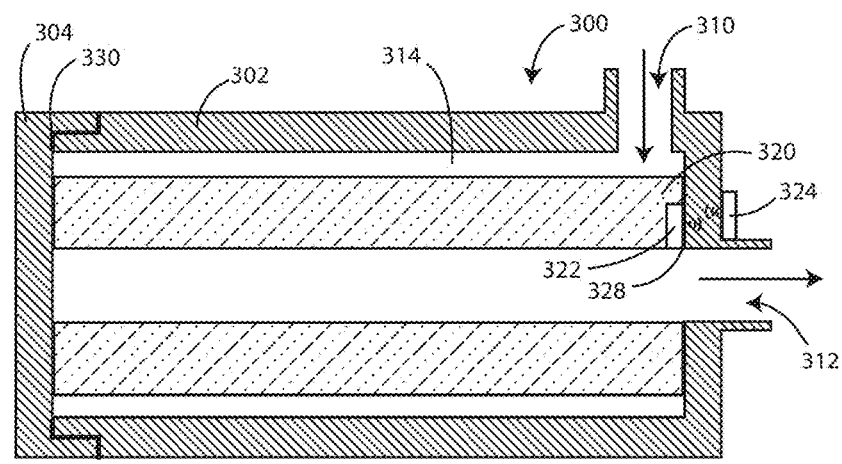
FIG. 3 is a schematic cross-sectional view of a filter system with a primary filter element installed therein in accordance with various embodiments herein.

Referring now to FIG. 3, a schematic cross-sectional view is shown of a filter system 300 with a primary filter element 320 installed therein in accordance with various embodiments herein. The filter system 300 can include a housing 302 comprising a fluid inlet 310 and a fluid outlet 312, the housing defining an internal volume 314. A primary filter element 320 can be disposed within the internal volume 314 of the housing 302 and can be configured to be removably disposed therein. In the view shown in FIG. 3, the primary filter element 320 is fully inserted into the housing 302 such that the primary filter element 320 is at a position that is close to or contacting the distal end 328 of the internal volume 314. At the opposite side of the internal volume 314 is the proximal end 330 of the internal volume 314. The proximal end 330 of the internal volume 314 is configured to engage with a removable cover 304 that fits adjacent to the proximal end 330 in order to seal off the proximal end of the housing from the flow of fluid there through. The removable cover 304 can engage the proximal end 330 and remain attached thereto through various devices or structures including threads, friction-fit mechanisms, latches, buckles, snap-fit mechanisms, or the like.

A short-range wireless communication tag, such as a near-field communication (NFC) tag 322, can be associated with, such as disposed on or in, the primary filter element 320. A short-range wireless communication reader, such as a near-field communication (NFC) reader 324, can be disposed in or on the housing 302. The NFC reader 324 can be configured to wirelessly send data to and receive data from the NFC tag 322 when the NFC reader 324 and the NFC tag 322 are at a distance 326 that is less than or equal to a maximum communication distance 346 for the NFC reader 324 and NFC tag 322.

Figure 4:
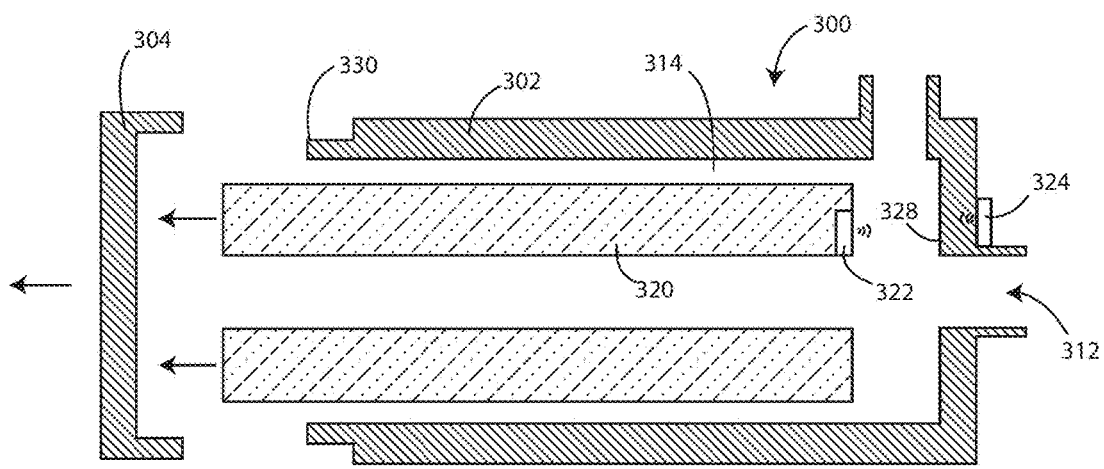
FIG. 4 is a schematic cross-sectional view of a filter system with a primary filter element being removed therefrom in accordance with various embodiments herein.

In various embodiments herein, removal of the primary filter element from the housing causes movement of the tag away from the reader by an amount that causes the distance between the tag and the reader to exceed the maximum communication distance. Referring now to FIG. 4, a schematic cross-sectional view is shown of a filter system 300 with a primary filter element 320 being removed therefrom in accordance with various embodiments herein. In this view, the cover 304 has been removed from the proximal end 330 of the internal volume 314. Further the primary filter element 320 has been moved away from the distal end 328 of the internal volume 314. As such, the NFC reader 324 and the NFC tag 322 are now disposed at a distance 326 that is greater than or equal to a maximum communication distance 346 for the NFC reader 324 and NFC tag 322.

It will be appreciated that embodiments of filter systems herein can include more than a single filter element. For example, in some embodiments herein, filter systems can be configured to including a primary filter element and a secondary filter element. The primary filter element can perform most or all of the filtering activity during normal operation. However, if the primary filter fails, then the secondary filter element (or backup filter element) can protect the machine into which the filter system is disposed by filtering the fluid for a period of time. In some embodiments, primary and secondary filters are changed at the same frequency. However, in other embodiments, primary filters are changed at a frequency that is greater than the frequency for changing secondary filters.

Figure 5:
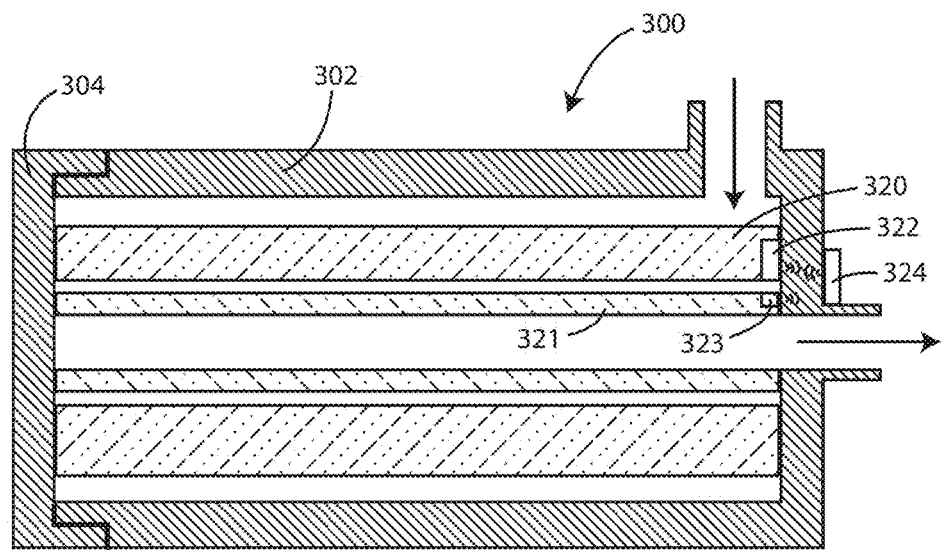
FIG. 5 is a schematic cross-sectional view of a filter system with a primary filter element and a secondary filter element installed therein in accordance with various embodiments herein.

Referring now to FIG. 5, a schematic cross-sectional view is shown of a filter system 300 with a primary filter element 320 and a secondary filter element 321 installed therein in accordance with various embodiments herein. The filter system 300 can include a housing 302 comprising a fluid inlet 310 and a fluid outlet 312, the housing defining an internal volume 314. A primary filter element 320 can be disposed within the internal volume 314 of the housing 302 and can be configured to be removably disposed therein. A secondary filter element 321 can be disposed within the internal volume 314 of the housing 302 and can also be configured to be removably disposed therein, with or without simultaneously removing the primary filter element 320.

In the view shown in FIG. 5, the primary filter element 320 and secondary filter element 321 are fully inserted into the housing 302 such that the primary and secondary filter elements 320, 321 are at a position that is close to or contacting the distal end 328 of the internal volume 314. At the opposite side of the internal volume 314 is the proximal end 330 of the internal volume 314. The proximal end 330 of the internal volume 314 is configured to engage with a cover 304 that fits adjacent to the proximal end 330 in order to seal off the proximal end of the housing from the flow of fluid there through.

A first NFC tag 322 can be associated with, such as disposed on or in, the primary filter element 320 and a second NFC tag 323 can be associated with, such as disposed on or in, the secondary filter element 321. An NFC reader 324 can be disposed in or on the housing 302. The NFC reader 324 can be configured to wirelessly send data to and receive data from the first NFC tag 322 and the second NFC tag 323 when the NFC reader 324 and the NFC tags 322, 323 are at a distance that is less than or equal to a maximum communication distance for the NFC reader 324 and NFC tags 322, 323.

Figure 6:
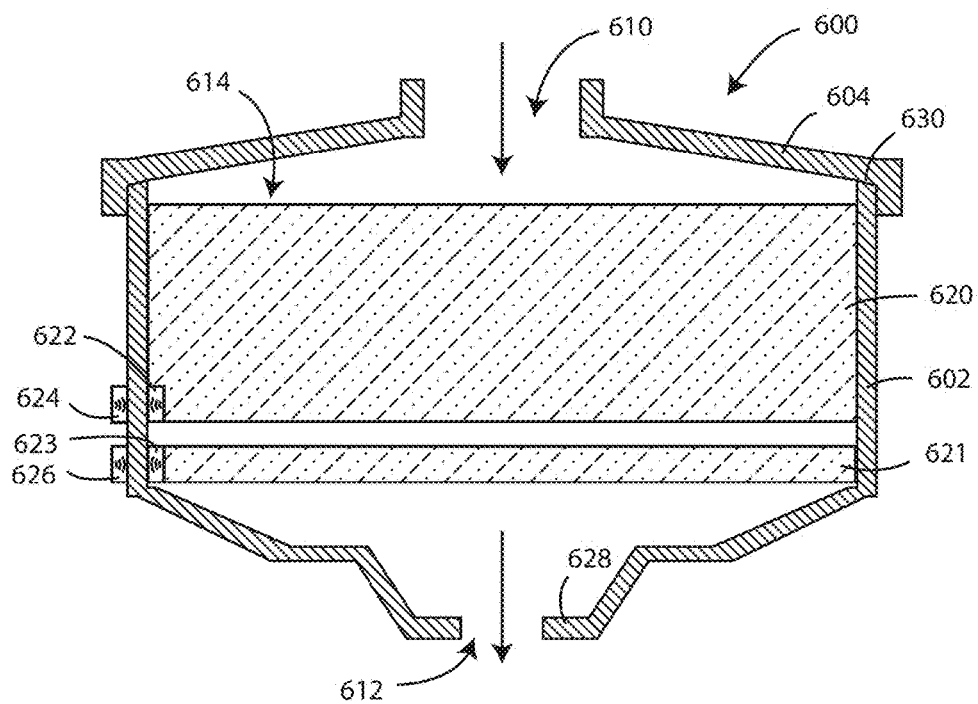
FIG. 6 is schematic cross-sectional view is shown of a filter system with a primary filter element and a secondary filter element installed therein in accordance with various embodiments herein.

It will be appreciated that filter systems herein can take on many different shapes and configurations. Referring now to FIG. 6, a schematic cross-sectional view is shown of a filter system 600 with a primary filter element 620 and a secondary filter element 621 installed therein in accordance with various embodiments herein. The filter system 600 can include a housing 602 comprising a fluid inlet 610 and a fluid outlet 612. The housing can define an internal volume 614. The primary filter element 620 can be disposed within the internal volume 614 of the housing 602 and can be configured to be removably disposed therein. The secondary filter element 621 can be disposed within the internal volume 614 of the housing 602 and can also be configured to be removably disposed therein. In this embodiment, the primary filter element 620 can be removed with or without also removing the secondary filter element 621.

In the view shown in FIG. 6, the primary filter element 620 and secondary filter element 621 are both fully inserted into the housing 602, but based on the design of the housing 602 are not equally close to the distal end 628 of the internal volume 614. At the opposite side of the internal volume 614 is the proximal end 630 of the internal volume 614. The proximal end 630 of the internal volume 614 is configured to engage with a cover 604 that fits adjacent to the proximal end 630 in order to seal off the proximal end of the housing from the flow of fluid there through.

A first short-range wireless communication tag 622 can be associated with, such as disposed on or in, the primary filter element 620 and a second short-range wireless communication tag 623 can be associated with, such as disposed on or in, the secondary filter element 621. A first short-range wireless communication reader 624 and a second short-range wireless communication reader 626 can be disposed in or on the housing 602. The readers 624, 626 can be configured to wirelessly send data to and receive data from the first tag 622 and the second tag 623 when the readers 624, 626 and the tags 622, 623 are at a distance that is less than or equal to a maximum communication distance for the readers 624, 626 and tags 622, 623.

Figure 7:
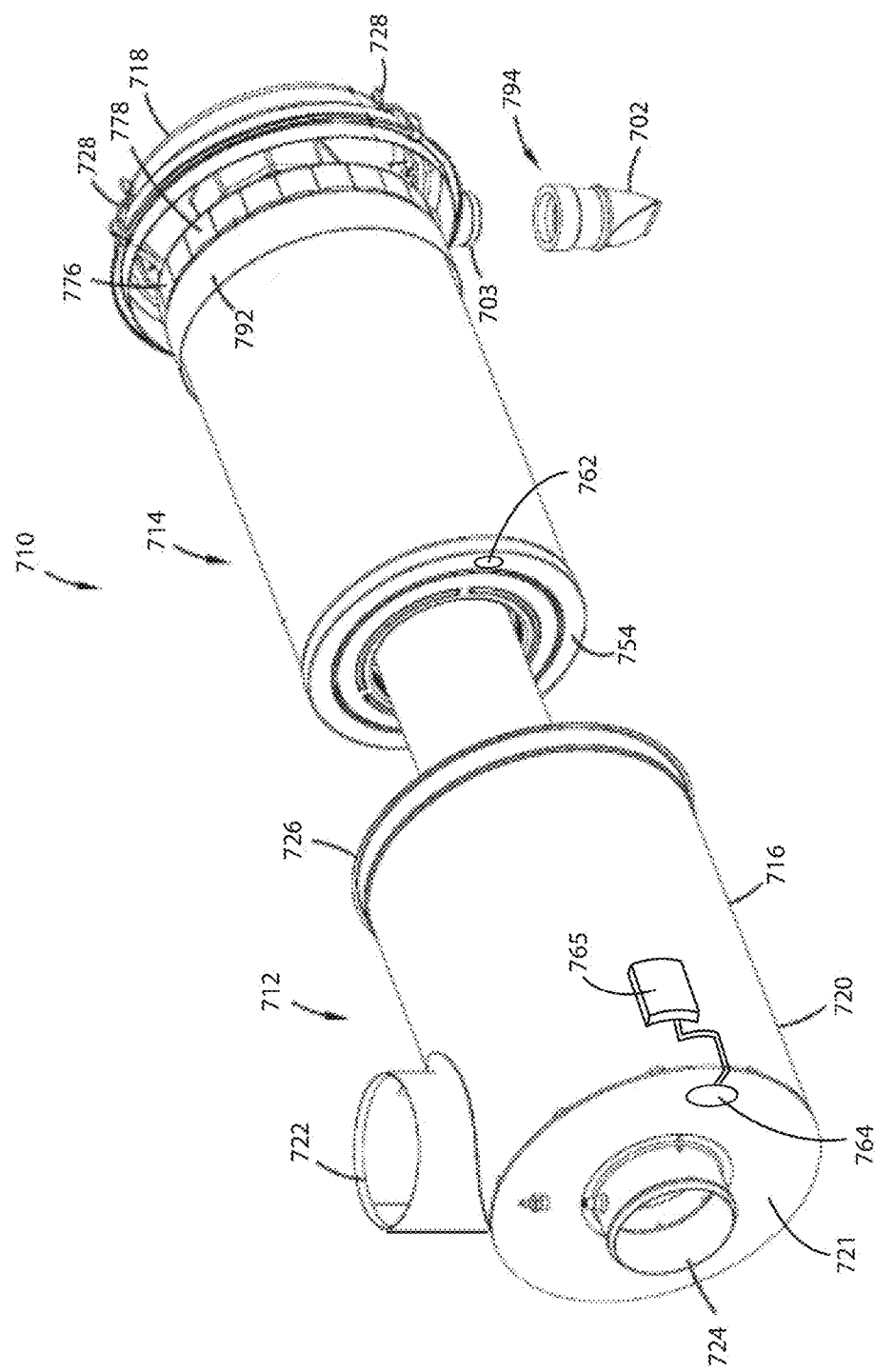
FIG. 7 is an exploded, perspective view is shown of a filter system including a housing and a filter element, constructed according to principles of this disclosure.

As referenced above, many different shapes and configurations for filter systems are contemplated herein. Referring now to FIG. 7, an exploded, perspective view is shown of a filter system 710 including a housing and a filter element, constructed according to principles of this disclosure. The filter system 710 depicted includes a housing 712 and a removable and replaceable primary filter element 714. In the one shown, the housing 712 includes a housing body 716 and a removable service cover 718. The cover 718 provides for service access to an interior of the housing body 716 for servicing. For a filter system 710 of the general type depicted in FIG. 7, servicing generally involves dismounting and removing from the housing 712 at least one filter element, such as filter element 714 depicted, either for refurbishing or replacement.

The housing 712 depicted includes an outer wall 720 having an end 721, an air inlet 722, and an air outlet 724. For the embodiment depicted, the inlet 722 and the outlet 724 are both in the housing body 716. In other embodiments, at least one of the inlet 722 or outlet 724 can be part of the cover 718. In typical use, ambient or unfiltered air enters the filter system 710 through the inlet 722. Within the filter system 710, the air is passed through the filter element 714 to obtain a desirable level of particulate removal. The filtered air then passes outwardly from the filter system 710 through the outlet 724 and is directed by appropriate duct work or conduits to an inlet of an air intake for an associated engine, or compressor, or other system.

While FIG. 7 describes a filter element for particulate removal, it will be appreciated that embodiments herein can also including filter systems and/or filter elements for removal of gas phase and/or liquid phase contaminants.

The particular filter system 710 depicted has outer wall 720 defining a barrel shape or generally cylindrical configuration. In this particular configuration, the outlet 724 can be described as an axial outlet because it generally extends in the direction of and circumscribes a longitudinal central axis defined by the filter element 714. The service cover 718 generally fits over an open end 726 of the housing body 716. In the particular arrangement shown, the cover 718 is secured in place over the end 726 by latches 728.

FIG. 7 also shows a tag 762 disposed on the first end cap 754 of the filter element 714. A reader 764 can be mounted on or in the end 721 of the housing 712. When the filter element 714 is fully inserted within the housing 712, the tag 762 can be close enough to the reader 764 in order to exchange wireless communications. In some embodiments, the reader 764 can be in electrical communication with a system controller 765. The system controller 765 can include various circuitry for telemetry, storage and/or processing of data (including RAM/ROM and/or data registers), power storage and/or modulation, and the like. In some embodiments the system controller 765 can include a microprocessor, a microcontroller, an application specific integrated circuit (ASIC), or the like. However, in some embodiments elements described above with respect to the system controller 765 can be integrated into the reader 764.

Figure 8:
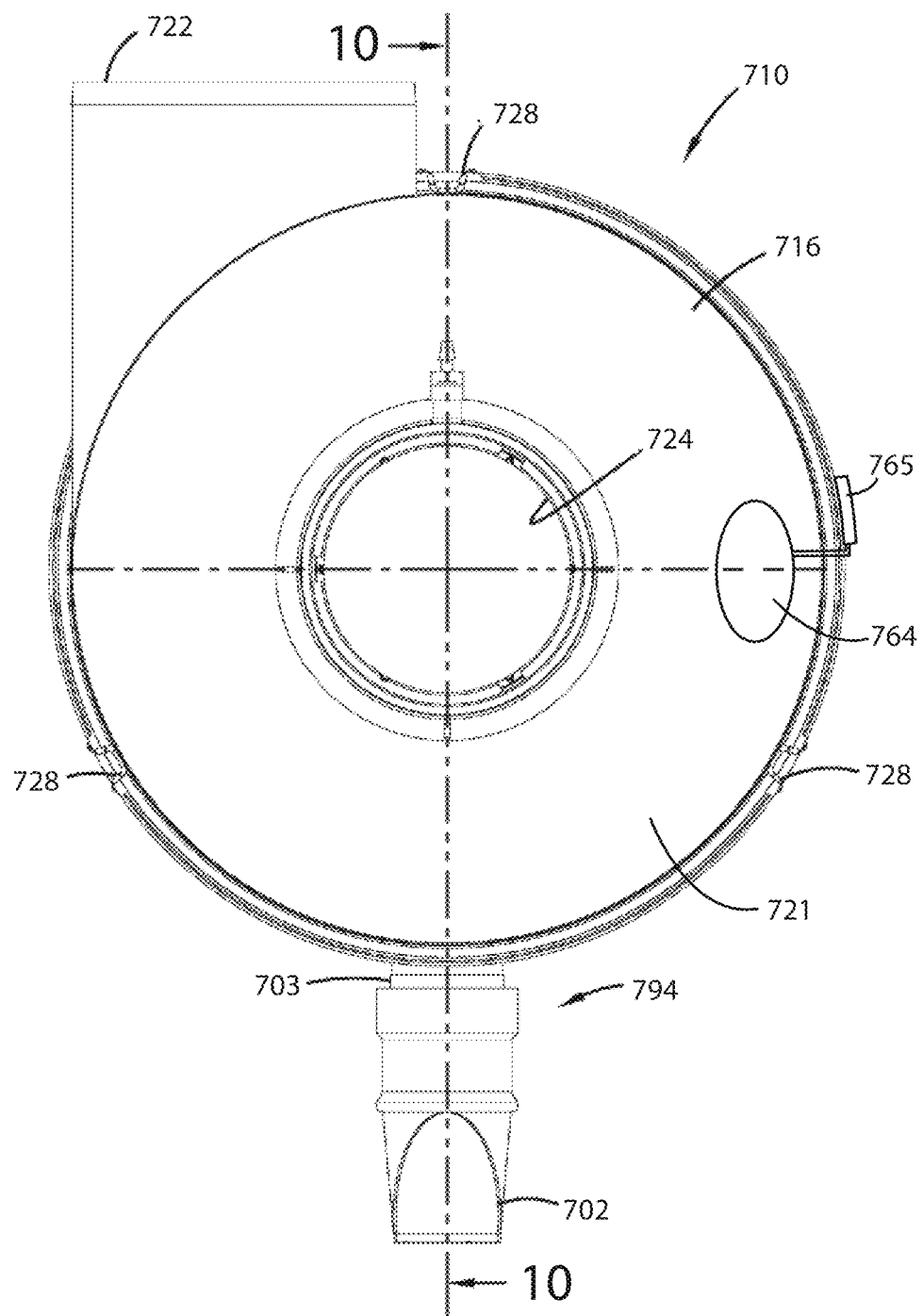
FIG. 8 shows an end elevational view of the filter system of FIG. 7 in an assembled orientation in accordance with various embodiments herein.

Referring now to FIG. 8, an end elevational view is shown of the filter system of FIG. 7 in an assembled orientation. As referenced above, a tag can be associated with, such as disposed on or in, the first end cap of the filter element. A reader 764 can be mounted on or in the end 721 of the housing. When the filter element is fully inserted within the housing, the tag on the filter element can be close enough to the reader 764 in order to exchange wireless communications. In some embodiments, the reader 764 can be in electrical communication with a system controller 765.

Many different physical configurations for a reader and/or tags are contemplated herein. In various embodiments, the reader and/or the tag can include a loop formed by a conductor that can serve as an antenna. In some embodiments, the shape of the reader and/or tag can be ovoid, circular, polygonal, irregular, or the like. In some embodiments, the reader and/or tag can define a loop with a central aperture. In some embodiments, the reader and/or tag can include multiple antennas of different sizes along with a switching device to selectively use one of the multiple antennas depending on the desired maximum communication distance. However, in other embodiments, the reader or tag defines no aperture.

Figure 9:
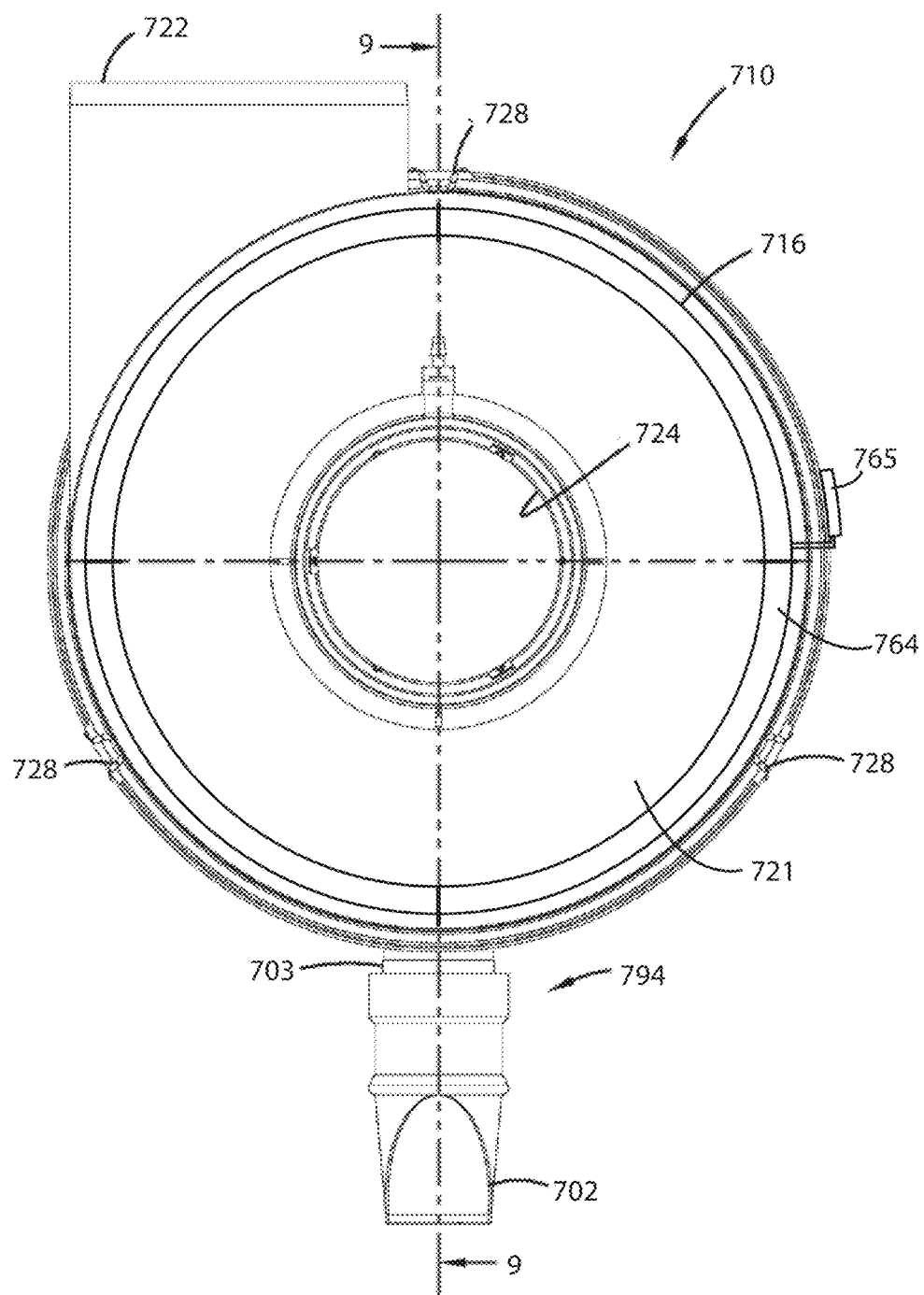
FIG. 9 is shows an end elevational view of the filter system of FIG. 7 in an assembled orientation in accordance with various embodiments herein.

Referring now to FIG. 9, an end elevational view is shown of the filter system of FIG. 7 in an assembled orientation, but including a reader having a different physical configuration. As referenced above, a tag can be associated with, such as disposed on or in, the first end cap of the filter element. A reader 764 can be mounted on or in the end 721 of the housing. When the filter element is fully inserted within the housing, the tag on the filter element can be close enough to the reader 764 in order to exchange wireless communications. In some embodiments, the reader 764 can be in electrical communication with a system controller 765.

However, unlike the reader 764 shown in FIG. 8, the reader 764 in FIG. 9 shows forms a loop that is disposed adjacent to an outer perimeter of the end 721 of the housing. In this configuration, the cross-sectional area encompassed by the reader 764 is relatively large in comparison with the total cross-sectional area of the end 721 of the housing.

Figure 10:
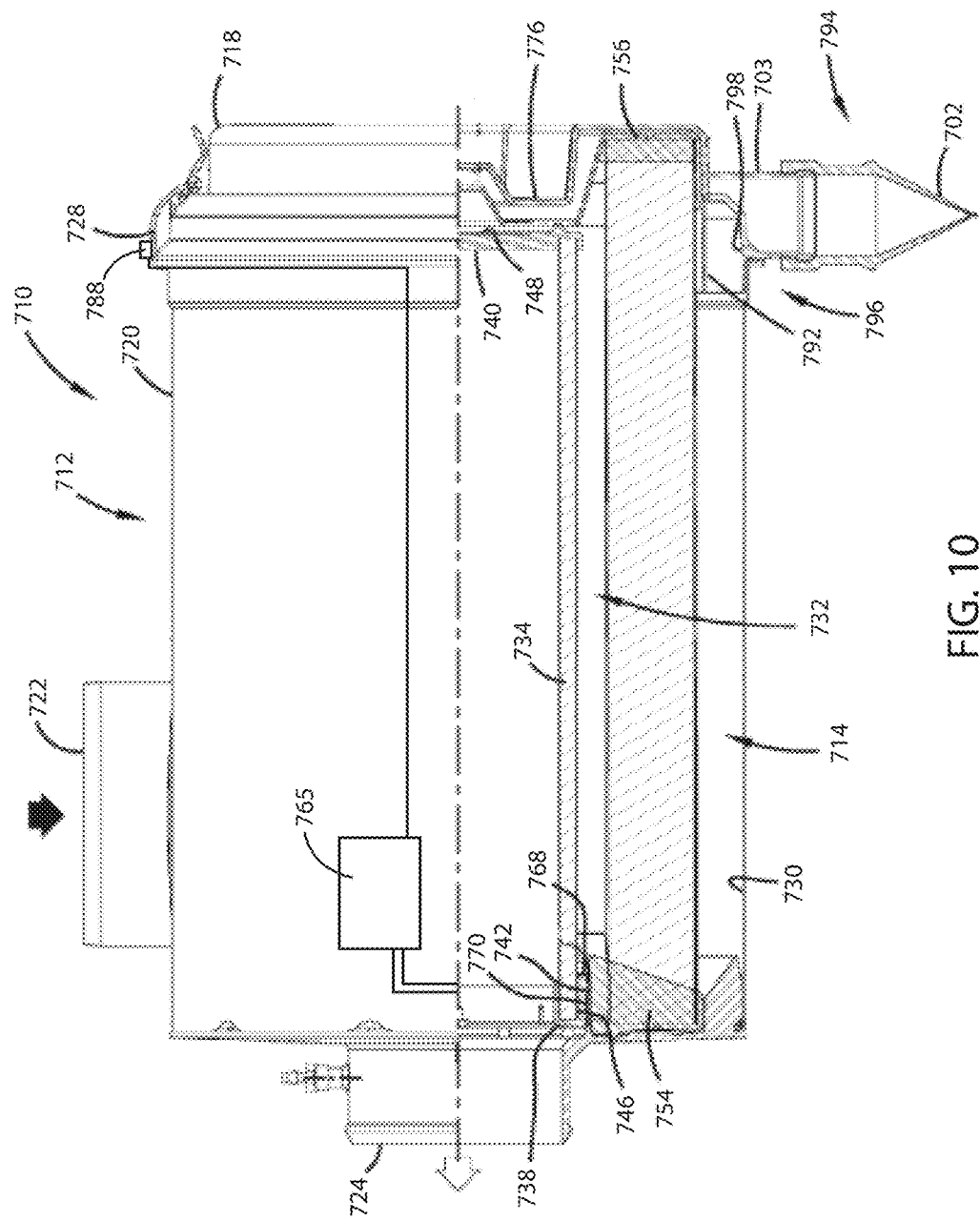
FIG. 10 is a partial cross-sectional view of the filter system of FIG. 7 in an assembled orientation in accordance with various embodiments herein.

Referring now to FIG. 10, a partial cross-sectional view of the filter system 710 is depicted. In reference now to FIG. 10, it can be seen that the body 716 defines an interior 730 of the filter system 710. Within the interior 730 for the particular filter system 710 depicted is positioned the filter element 714, through which air is directed during use. In this embodiment, there is also depicted an optional secondary or safety filter element 732.

Herein, the terms "filter element" or "element" refer to a removable, replaceable component that includes filter media through which the air being filtered passes, as the air is directed, from the inlet 722, through the interior 730, to the outlet 724, with the element 714 performing an air filtration (or dust removal) function. Unless otherwise stated, the terms "element", "filter element", and "filter" are meant to refer to a removable and replaceable component within the filter system 710. Preferably, filter elements are configured such that they can be removed and replaced by hand, at appropriate service intervals.

Herein, the term "primary element" or "primary filter element" generally refers to a filter element in which a majority of dust loading occurs during filter system use. In typical systems that have two elements, the primary element is positioned upstream from the safety element, during typical assembly. By "upstream" in this context, it is meant that due to filter element position, filter system configuration, and the location of seals during use, air or another fluid generally must pass through the primary element before the air passes through the safety element when the air or other fluid moves from the inlet 722 to the outlet 724.

Herein, the term "secondary element" or "safety element" refers to a downstream element from the primary element. Typically, very little dust loading occurs on the safety element and generally occurs only as a result of either failure of some portion of the primary element or failure of a seal, or inadvertent dust movement during servicing of the primary element, or some other mishap.

The safety element 732 depicted in FIG. 10 includes a cylindrical extension of filter media 734 defining an open filter interior 736. The filter media 734 extends between an open end cap 738 and a closed end cap 740. The filter media 734 used in the safety element 732 can be pleated media, depth media, felt, or any type of media as determined appropriate by the designer of the filter system 710.

The safety element 732 is operably installed within the housing 712 to allow it to be sealed and occasionally removed and replaced with a new safety element 732. A seal 742 is depicted between the safety element 732 and the housing 712. While a number of different type of seals could be used, in the embodiment shown, the seal 742 depicted is a radial seal 744; specifically, an outwardly directed radial seal between the open end cap 738 and an internal wall 746 of the body 716.

In the embodiment shown, the closed end cap 740 of the safety element 732 is generally a flat disk 748. In some embodiments, the closed end cap 740 can include a projection that engages a portion of the primary element 714. An example of the engagement between the safety element 732 and the primary element 714 is shown in U.S. Pat. No. 6,652,614, incorporated by reference herein.

A tubular extension of filter media can extend between the first end cap 54 and the second end cap 56. In the embodiment shown, the tubular extension of filter media is cylindrical in shape, and in other embodiments, could be conical or oval, for example. The tubular extension of filter media defines an open filter interior. In the embodiment shown in FIG. 10, the open filter interior accommodates the safety element. Many different types of filter media can be used. In some embodiments, the filter media can be pleated media. The pleated media can be pleated paper or cellulose.

In the embodiment shown in FIG. 10, also extending between the first end cap 54 and second end cap 56 can be an inner media support or liner. The inner liner helps to support the media due to operating pressures and other conditions. The inner liner can be non-metal, or it may also be metal, such as an expanded metal.

The filter element 714 is releasably sealed to the housing 712 at seal 768. There are a variety of techniques for releasably sealing the filter element 714 to the housing 712. In the embodiment shown, a radial seal 770 is formed between the element 714 and the housing 712. Specifically, an internally directed radial seal 770 is formed between the first end cap 754 and the internal wall 746 of the housing body 716.

The second section 792 is part of a pre-cleaner for the filter system 710. Specifically, and in reference now to FIG. 10, the filter system 710 has a dust ejector 794 as part of the housing 712; in particular, as part of the cover 718. Air to be filtered enters the housing 712 through the inlet 722, and the pre-cleaner 796 helps to separate out large dust particles and eject them through the dust ejector 794 before they reach the primary element 714. Specifically, the second section 792 allows inlet air to circumferentially rotate or swirl around the second section 792. This rotation of the air around the second section 792 creates centrifugal forces that cause dust particles to drop to the bottom 798 of the housing 712, where they flow through an ejector outlet 703 in the cover 718 and then through an evacuation valve 702.

In the embodiment shown, the cover 718 includes structure to mate with the second end cap 756 to help laterally support the filter element 714 in an operable position in the housing 712 with the radial seal 770 in place. In the embodiment shown in FIG. 7 the cover 718 includes a protrusion 776 projecting into the closed recess 708 of the second end cap 756. Preferably, the cover 718 also defines a recess 778 oriented to receive a projection of the second end cap 756. As can be seen in FIG. 10, when the protrusion is received within the closed recess 708, and when the projection is received by the recess 778, this will help keep the filter element 714 in place mounted on the wall 746 with the radial seal 770 in place.

While many of the filter elements and housings shown so far herein depict cylindrically shaped filter elements and housings configured to fit the same, it will be appreciated that filter elements having many different shapes are contemplated herein. In addition, while embodiments referenced above that include secondary or safety filter elements show such secondary or safety filter elements fitting within a primary filter element, many other configurations of filter systems including primary and secondary filter elements are contemplated herein. References to a "first filter element" can refer to either a primary or a secondary filter element as described herein, depending on the context. Similarly, references to a "second filter element" can refer to either a primary or a secondary filter element as described herein, depending on the context.

In some embodiments, a latch sensor 788 can be associated with the latch 728. The latch sensor 788 can detect with the latch 728 is actuated, such as in the course of removing the cover 718. The latch sensor 788 can communicate with other components of the system in either a wired or wireless fashion. In some embodiments, the latch sensor 788 can be in electronic communication with the controller 765. Various components can be used to form the latch sensor 788 including, but not limited to, piezoelectric sensors, switch sensors, capacitive sensors, and the like.

Figure 11:
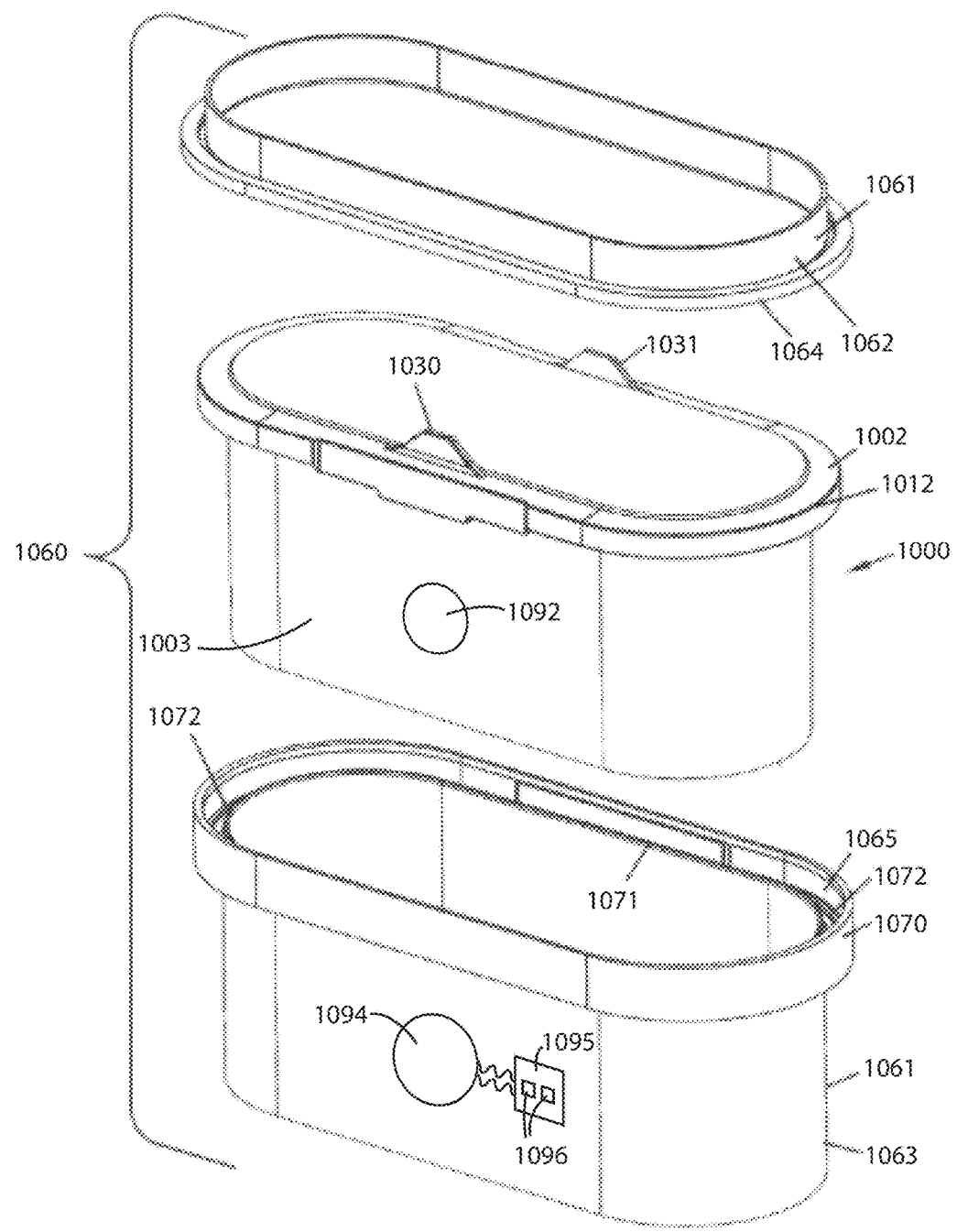
FIG. 11 is a schematic exploded perspective view of a filter system having a filter element therein in accordance with various embodiments herein.

Referring now to FIG. 11, a schematic exploded perspective view of a filter system 1060 having a filter element 1000 therewith is depicted. The filter system 1060 can include a housing 1061 having housing sections 1062, 1063 between which axial housing seal arrangement 1002 would be positioned, and pinched, during installation. One of the housing sections 1063 will typically be a filter element receiver, and will include a receiving trough 1065 therein, into which seal arrangement 1002 is fit during installation. A second housing section 1063 would generally include a pressure flange 1064 oriented to apply pressure to surface 1014 during installation, helping to ensure that seal surface 1015 is pressed, to adequately pinch seal member 1012 against shelf or seal surface portions of trough 1065 for sealing. Various retention mechanisms such as bolts or over center latches can be used to apply and retain the force.

Still referring to FIG. 11, housing section 1063 includes a seal region outer perimeter rim 1070, which can surround seal arrangement 1002 and project therefrom in the same direction as optional handle members 1030, 1031, during installation. Filter element 1000 can recess within rim 1070.

Still referring to FIG. 11, the housing section 1063 also includes a seal region inner perimeter rim 1071, surrounding by rim 1070 and spaced therefrom by trough 1072 which includes a seal engagement surface. Rim 1071 is optional, but preferred. It will typically be positioned so that a portion of the seal arrangement or member 1012 will be positioned between rim 1071 and rim 1070, when the filter element 1000 is property installed.

A tag 1092 can be associated with, such as disposed on or in, the filter element 1000. In particular, the tag 1092 can be disposed on or in a side wall 1003 of the filter element 1000 or on or in another component of the filter element 1000. A reader 1094 can be associated with, such as mounted on or in, the housing 1061. When the filter element 1000 is fully inserted within the housing 1061, the tag 1092 on the filter element 1000 can be close enough to the reader 1094 in order to exchange wireless communications. In some embodiments, the reader 1094 can be in electrical communication with a contact pad 1095 including electrical contacts 1096. The contact pad 1095 can facilitate connecting the reader 1094 with other equipment. In some embodiments, in addition to or instead of a contact pad, the reader 1094 can be in electrical communication with an electrical plug to facilitate connecting the reader 1094 with other equipment.

It is noted that the housing 1062 of FIG. 11 is schematic. The housing can also have additional features relating to its installation, air flow inlet, air flow outlet, etc. Also, the tag 1092 can be in many different specific positions, such as on the inside of filter element 1000 or within or between other components of the filter element 1000 or filter system.

Figure 12:
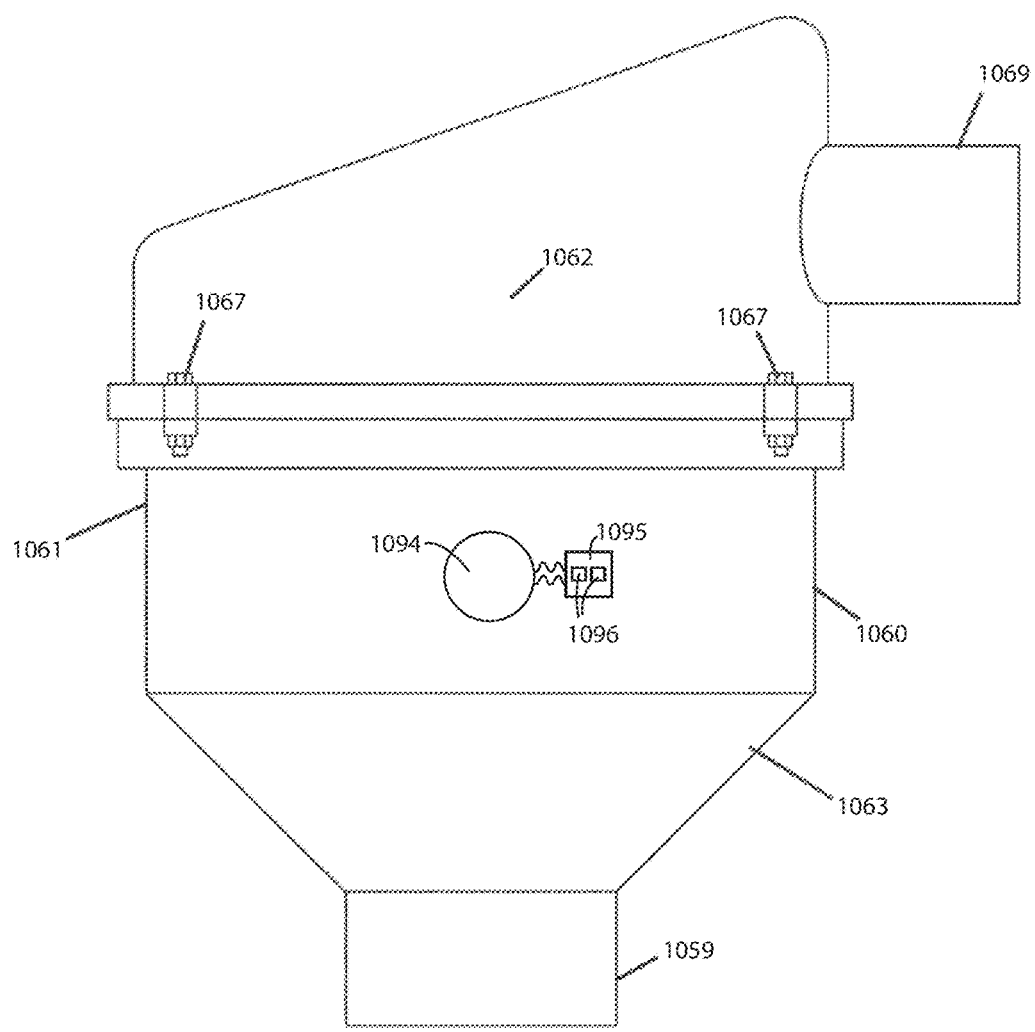
FIG. 12 is a schematic view of a filter system including a housing having first housing section and a second housing section.

In FIG. 12, another embodiment of a filter system 1060 is shown schematically, including a housing 1061 having first housing section 1062 and second housing section 1063. The housing 1061 includes an airflow inlet 1069 and an airflow outlet 1059. Bolts 1067 secure the housing sections 1062, 1063 together, and will provide a pinching force to the seal arrangement 1002.

It is noted that in the depiction of FIG. 12, the inlet 1069 is in section 1062, and the outlet 1059 is in section 1063. In some embodiments, both the inlet 1069 and outlet 1059 can be positioned in a single housing section, for example section 1063, with the other section 1062 operating as a separable access cover and contoured to provide the sealing pressure.

As referenced above, a reader 1094 can be mounted on or in the housing 1061. When the filter element is fully inserted within the housing, the tag on the filter element can be close enough to the reader 1094 in order to exchange wireless communications. In some embodiments, the reader 1094 can be in electrical communication with a contact pad 1095 including electrical contacts 1096.

Figure 13:
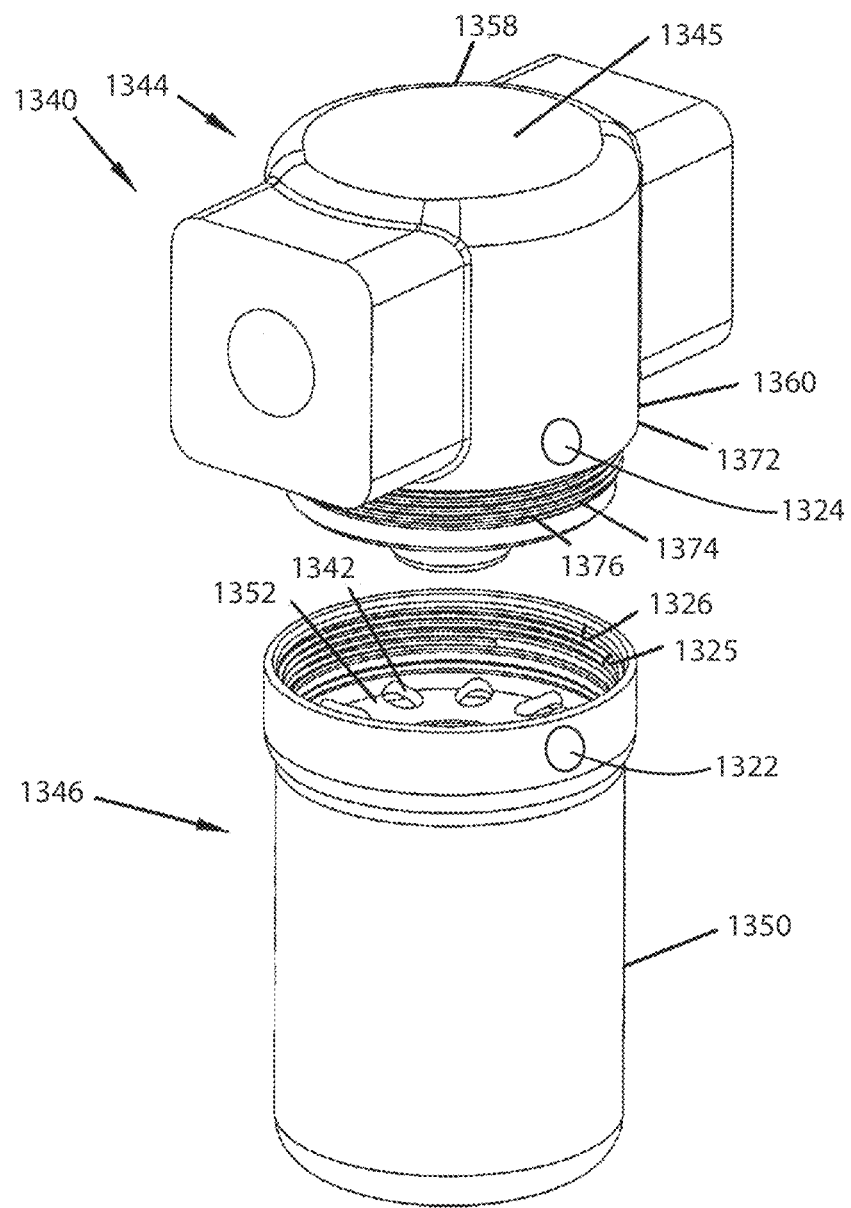
FIG. 13 is an exploded, perspective view of a filter assembly including a filter head and a spin-on canister filter in accordance with various embodiments herein.

Referring now to FIG. 13, an exploded, perspective view is shown of a filter assembly 1340 including a filter head 1344 and a spin-on canister filter 1346. The filter head 1344 is capable of operably receiving both spin-on canister filter 1346 and a bowl-cartridge filter (not shown). By "operably receiving", it is meant that the filter head 1344 includes appropriate structure for engaging the spin-on canister filter 1346, such that fluid to be cleaned is directed through the appropriate channels and cleans the fluid as intended. In reference to FIG. 13, the spin-on canister filter 1346 includes single-use housing 1350 and baffle plate 1352. The housing 1350 defines a filter interior permanently holding a non-replaceable cartridge filter (filter element). In some embodiments, the filter head 1344 includes an end face 1345.

The baffle plate 1352 includes a plurality of apertures 1342 to permit fluid flow from the filter head 1344 into the interior volume of the spin-on canister filter 1346.

The filter head 1344 includes a block 1358 including a continuous exterior wall member 1360 forming an outer tube surrounding an internal volume. The filter head block 1358 can define a first port, which in forward flow systems is an inlet port, and a second port, which in forward flow systems is an outlet port, and an interior or center tube, which is within the internal volume and is circumscribed by the outer tube.

In some embodiments, the outside surface 1372 can have first mechanical connection structure 1374. The first mechanical connection structure 1374 includes many types of arrangements. Of those arrangements possible, examples include threads, bayonet connections, bead and groove connections, etc. In the particular embodiment illustrated, the first connection structure 1374 includes a first plurality of threads 1376. In this particular embodiment, the first plurality of threads 1376 is located on the outside surface 1372 of the wall member 1360. However, in other embodiments, the first plurality of threads can be located along the inside surface of the wall member 1360.

The spin-on canister filter 1346 can include a second mechanical connection structure 1325, which in this case, is depicted as threads 1326. The threads 1326 engage the threads 1374.

A short-range wireless communication tag 1322 can be associated with, such as disposed on or in, the spin-on canister filter 1346. A short-range wireless communication reader 1324 can be associated with, such as disposed on or in, filter head 1344 or a component thereof such as the wall member 1360. The reader 1324 can be configured to wirelessly send data to and receive data from the tag 1322 when the reader 1324 and the tag 1322 are at a distance that is less than or equal to a maximum communication distance for the reader 1324 and tag 1322.

The maximum communication distance between the reader 1324 and the tag 1322 can be such that when the spin-on canister filter 1346 is removed from the filter head 1344, the maximum distance is exceeded and communication between the reader 1324 and the tag 1322 ceases. In some embodiments, the tag 1322 can be disposed away from the center of rotation of the spin-on canister. In such embodiments, the distance between the tag 1322 and the reader 1324 can increase not only as the spin-on canister filter 1346 is moved away during a canister removal process, but also the distance can cyclically increase and decrease along with each rotation of the spin-on canister. In such an embodiment, the rotational position of the spin-on canister filter 1346 with respect to the filter head 1344 affects the distance between the tag 1322 and the reader 1324 and therefore communication between the tag 1322 and the reader 1324, or the lack thereof, can be used to assess the rotational position of the spin-on canister filter 1346 with respect to the filter head 1344. In some embodiments, if the spin-on canister filter 1346 is not fully screwed onto the filter head 1344, then the distance between the tag 1322 and the reader 1324 exceeds the maximum communication distance between the two. In some embodiments, the tag 1322 and the reader 1324 are positioned such that the spin-on canister filter 1346 must be within 30 degrees, 25 degrees, 20 degrees, 15 degrees, 10 degrees, 5 degrees, 3 degrees, 2 degrees or 1 degree of full rotation onto the filter head 1344 in order for communication to occur between the tag 1322 and the spin-on canister filter 1346. Further aspects of spin-on canister filters are described in U.S. Publ. Pat. Appl. No. 2004/0079693, the content of which is herein incorporated by reference.

Figure 14:
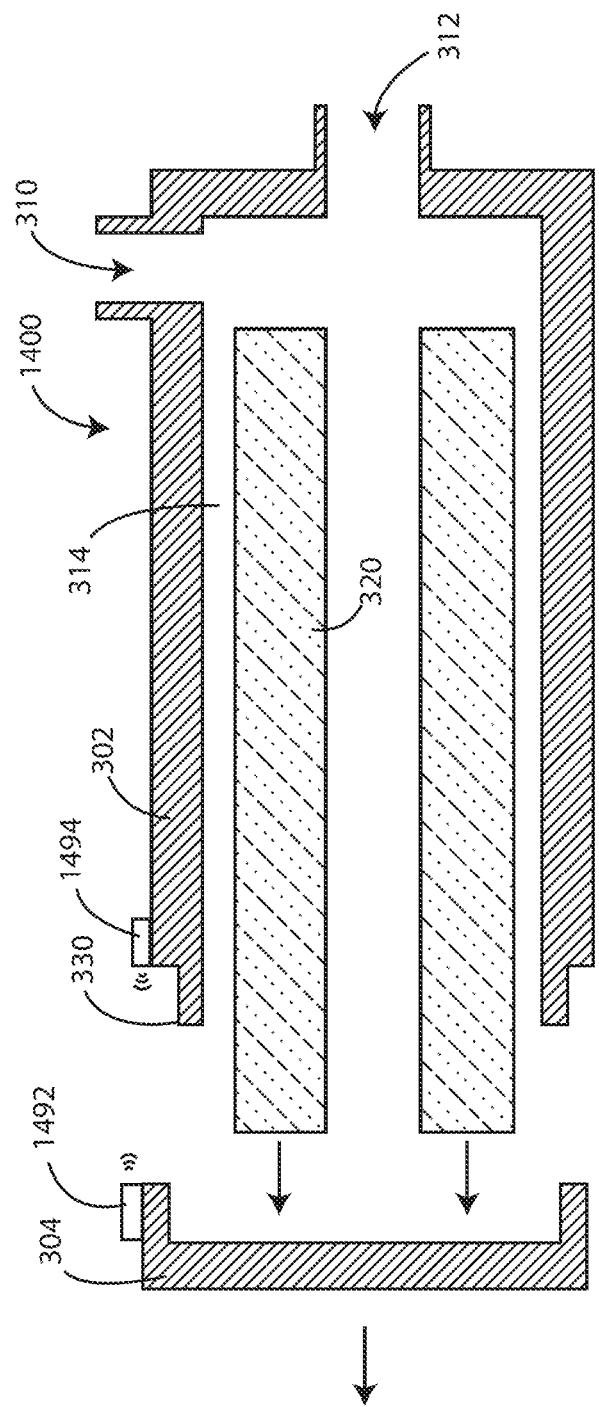
FIG. 14 is a schematic cross-sectional view of a filter system with a primary filter element being removed therefrom in accordance with various embodiments herein.

In some embodiments, one or more short-range wireless communication tags and readers can positioned to allow detection of removal and/or reinstallation of a cover from a housing of a filtration system herein. Referring now to FIG. 14, a schematic cross-sectional view is shown of a filter system 1400 with a primary filter element 320 being removed therefrom therein in accordance with various embodiments herein. The filter system 1400 can include a housing 302 comprising a fluid inlet 310 and a fluid outlet 312, the housing defining an internal volume 314. A primary filter element 320 can be configured to be disposed within the internal volume 314 of the housing 302. The proximal end 330 of the internal volume 314 is configured to engage with a removable cover 304 that fits adjacent to the proximal end 330 in order to seal off the proximal end of the housing from the flow of fluid there through. The removable cover 304 can engage the proximal end 330 and remain attached thereto through various devices or structures including threads, friction-fit mechanisms, latches, buckles, snap-fit mechanisms, or the like.

A short-range wireless communication tag 1492, can be associated with the cover 304, such as disposed on or in the cover 304. A short-range wireless communication reader 1494, can be disposed in or on the housing 302, such as on, in, or near the proximal end 330 of the housing 302. The reader 1494 can be configured to wirelessly send data to and receive data from the tag 1492 when the reader 1494 and the tag 1492 are at a distance that is less than or equal to a maximum communication distance for the reader 1494 and tag 1492. Removal of the cover 304 from the housing can cause the distance between the reader 1494 and the tag 1492 to exceed the maximum communication distance, causing communication between the reader and the tag to cease. As such, communication, or the lack thereof, between the tag 1492 and the reader 1494 can be used to assess whether the cover 304 is fitted onto the housing 302 or removed from the housing 302. Events such as cover removal and/or reinstallation can be detected and recorded by the system.

Short-Range Wireless Communications

As referenced above, embodiments herein can include the use of short-range wireless communication components such as tags and readers placed on onto filter elements and the housings into which they fit. The tags and readers can be arranged such that removal of the filter elements therefrom causes the tag and the associated reader to be separated by a distance that exceeds the operating wireless communication distance of the pair. As such, removal of the filter elements from the housings into which they fit can be determined based on sensing an absence in communication between the wireless tag and the associated wireless reader.

The short-range wireless communication components can use various communication standards/protocols and various specific component constructions. However, in various embodiments herein, power is provided to the tag component wirelessly. Wireless power transmission technologies use time-varying electric, magnetic, or electromagnetic fields. Wireless power transmission techniques mainly fall into two categories, non-radiative and radiative. In near-field or non-radiative techniques, power is transferred by magnetic fields using inductive coupling between coils of wire, or by electric fields using capacitive coupling between metal electrodes. In various embodiments herein, inductive coupling is used to deliver power to the tag component wirelessly.

In some embodiments, the short-range wireless communication components herein are, specifically, near-field communication (NFC) components. Near-field wireless communication employs electromagnetic induction between two loop antennas when NFC-enabled devices or components exchange information. Generally, NFC devices operate within the globally available unlicensed radio frequency ISM band of 13.56 MHz on ISO/IEC 18000-3 air interface at rates ranging from 106 to 424 Kbit/s.

NFC devices can operate in various modes, including NFC card emulation, NFC reader/writer, and NFC peer-to-peer. In various embodiments, NFC devices herein are operating in reader/writer mode, which NFC-enabled devices to read information stored on NFC tags embedded in or disposed on filter elements.

In accordance with various embodiments herein, tags can be passive data stores which can be read, and under some circumstances written to, by a device, such as a reader device. They typically contain data (in some cases between 96 and 8,192 bytes). In some embodiments the tags are read-only, but in some embodiments they can be rewritable. In some embodiments, a tag in accordance with embodiments herein can include an antenna consisting of a coil of wire and an integrated circuit (IC) which can include memory circuits for data storage. In various embodiments, the tag can also include a capacitor. The reader typically has its own antenna, which can continuously or intermittently transmit a short-range radio frequency field.

When the tag is placed within range of the reader, the antenna coil and capacitor, which form a tuned circuit, absorb and store energy from the field, resonating like an electrical version of a tuning fork. This energy can be rectified to direct current which powers the integrated circuit. The integrated circuit can send its data to the antenna coil, which transmits it by radio frequency signals back to the reader unit. However, it will be appreciated that a return signal from the tag to the reader could also come back in various other ways such as light signals (including but not limited to infrared light), electromagnetic signals other than radio frequency signals, and the like. In some embodiments, the reader can check whether information received (such as an ID number) is correct, and then can perform various functions. In some embodiments, the reader can cause data to be written into the memory of the tag. Since all the energy to power the tag comes from the reader unit, the tag must be close to the reader to function. Therefore, communication between the tag and the reader only has a limited range.

The distance for short-range wireless communication in embodiments herein can vary. In some embodiments, steps can be taken to purposefully limit the range of short-range wireless communication including, but not limited to, varying the size of the antenna coil, limiting the power associated with the emission of the radio frequency field, and the like. In some embodiments, the maximum short-range wireless communication distance is less than 12, 10, 8, 7, 6, 5, 4, 3, or 2 inches. In some embodiments, the maximum short-range wireless communication distance is within a range wherein any of the foregoing can serve as the upper or lower bound of the range. In some embodiments, the maximum short-range wireless communication distance is less than 30, 25, 20, 18, 16, 14, 12, 10, 8 or 6 centimeters.

Wireless Communication Proximity Sensing

As referenced above, steps can be taken to purposefully limit the range of short-range wireless communication including, but not limited to, varying the size of the antenna coil, limiting the power associated with the emission of the radio frequency field or other electromagnetic field, and the like. In some embodiments, proximity of the tag to the reader can be determined by adjusting the maximum range of short-range wireless communication downward until communication is lost. For example, in some embodiments, the reader can include more than one antenna coil, with the coils of each antenna coil being of a different size than one another and therefore offering different maximum short-range wireless communication ranges. In some embodiments, the different antenna coils of the reader can be energized sequentially and the distance between the reader and the tag can then be approximated by determining the antenna coil at which communication with the tag fails. For example, if a first antenna coil is known to provide wireless communication up to 10 centimeters and a second antenna coil is known to provide wireless communication up to 8 centimeters, and if communication using the second antenna fails but communication using the first antennal coil is successful, then the distance between the tag and the reader including the coils can be estimated to be between 8 and 10 centimeters. In other embodiments, the magnitude of the wireless signal coming from the tag can be quantified and then distance can be estimated using a standard table, which can be empirically determined for the particular type of filter housing and filter element(s) being used. In some embodiments, two or more tags can be used on the same element. The tags can be disposed at different positions, such that distance can be approximated by seeing which tag or tags are active and which are not.

Communication Patterns

In various embodiments herein, systems can identify a filter element change or removal event by detecting a particular pattern of communication. For example, when a filter element including a short-range wireless tag is properly installed within a filter system, such that the tag is within communication distance of a corresponding short-range wireless reader disposed on or in the filter system housing, communication can occur between the two components and the existence of this successful communication can be recorded by the reader, in some cases along with a time stamp. When a filter element is removed from the housing for replacement and/or servicing, the distance between the tag and the corresponding reader can exceed the maximum communication distance, which can cause the tag to lose power, terminating communication between the tag and the corresponding reader. When a filter element is reinstalled within the filter housing, the distance between the tag and the corresponding reader can then be less than the maximum communication distance, which can be sufficient to cause the tag to power-up again and allow communication between the tag and the corresponding reader to resume.

As such, the pattern of communication in this filter removal and replacement sequence can be characterized by a first phase of active communication, followed by a phase of no communication, followed by a second phase of active communication (e.g., a pattern of "ON-OFF-ON"). A processing unit (as part of a system controller, reader, associated component, external server, etc.) can monitor communications to identify this pattern ("ON-OFF-ON") and when it is detected increment a counter corresponding to filter removal/change events along with recording a date and time stamp associated with the identified pattern. The counter can exist in the memory of the reader, the tag, the system controller, or another component that is part of the filtration system or separate and/or remote therefrom.

In some embodiments, in order to ensure that noise or spurious short duration breaks in communication are not interpreted to be non-communication phases associated with actual filter removal, the processing unit can require that the duration of the non-communication be longer than a threshold value. For example, in some embodiments, the non-communication phase must exceed 0.2, 0.5, 1, 2, 5 or 10 seconds in length.

It will be appreciated that in accordance with various embodiments herein, patterns other than the "ON-OFF-ON" pattern described above can also be identified. In some embodiments, patterns can be detected including, but not limited to "ON-OFF", "OFF-ON", and simply "OFF".

In some embodiments, information can be written to a memory circuit that is part of a short-range wireless communication tag after the system controller identifies an "OFF-ON" pattern in the electrical signals received from the short-range wireless communication reader, wherein the OFF phase of the pattern corresponds to periods of no communication between the short-range wireless communication tag and the short-range wireless communication reader and the ON phase of the pattern corresponds to periods of communication between the short-range wireless communication tag and the short-range wireless communication reader.

In some embodiments, cover opening or removal events can be detected and recorded in memory and/or data about the same can be transmitted through a data network and remotely stored. In some embodiments, latch actuation events can be detected and recorded in memory and/or data about the same can be transmitted through a data network and remotely stored.

In some embodiments, data regarding detected events, such as filter removal and/or change events, or detection of any of the patterns described herein, can be written into the memory of the tag associated with the filter element(s). In this manner, the filter element can be analyzed after removal from the system in order to determine how many events (such as removal events and/or installation events) it has experienced. In some embodiments, processing steps such as analyzing data for patterns and then determining the occurrence of events based on the same can occur at the level of the reader, the system controller, or another component that is part of the filtration system or separate and/or remote therefrom, but outputs therefrom such as a count of the number of filter element removal and/or reinstallation events can be written into the memory of the tag.

In some embodiments, one or more components of the system can be interrogated in order to gather information stored by the same. For example, as described above, in some embodiments, data such as the aspects described above can be stored within the memory of a tag, reader, controller or the like. The tag, reader, or controller can be interrogated in order to retrieve data from the same. In some embodiments, a tag with data stored thereon can be interrogated by (and energized by) a dedicated reading device in order to retrieve data from the same. In some embodiments, the system can be queried either locally or remotely in order to retrieve information from the same. However, in some embodiments the system can be configured to push data such as the aspects described above out through a data network without first receiving a query. Such data can be pushed out substantially continuously or periodically.

Aspects have been described with reference to various specific and preferred embodiments and techniques. However, it should be understood that many variations and modifications may be made while remaining within the spirit and scope herein. As such, the embodiments described herein are not intended to be exhaustive or to limit the invention to the precise forms disclosed in the following detailed description. Rather, the embodiments are chosen and described so that others skilled in the art can appreciate and understand the principles and practices.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention claimed is:

1. A filtration system comprising:
a housing comprising a fluid inlet and a fluid outlet, the housing defining an internal volume;
a first filter element configured to be removably disposed within the housing;
a short-range wireless communication tag associated with the first filter element;
a short-range wireless communication reader associated with the housing, the reader configured to wirelessly send data to and receive data from the short-range wireless communication tag when the short-range wireless communication reader and the short-range wireless communication tag are at a distance that is less than or equal to a maximum communication distance;
wherein removal of the first filter element from the housing causes movement of the short-range wireless communication tag away from the short-range wireless communication reader by an amount that causes the distance between the short-range wireless communication tag and the short-range wireless communication reader to exceed the maximum communication distance; and
a system controller, the system controller configured to receive electrical signals from the short-range wireless communication reader, the system controller configured to identify patterns in the electrical signals received from the short-range wireless communication reader;
the system controller configured to identify ON-OFF-ON patterns in the electrical signals received from the short-range wireless communication reader; wherein detection of an ON-OFF-ON pattern is counted as a filter element removal or a filter reinstallation event; wherein the OFF phase of the pattern corresponds to periods of no communication between the short-range wireless communication tag and the short-range wireless communication reader and the ON phase of the pattern corresponds to periods of communication between the short-range wireless communication tag and the short-range wireless communication reader.

2. The filtration system of claim 1, further comprising:
a second filter element configured to be removably disposed within the housing; and
a second short-range wireless communication tag associated with the second filter element.

3. The filtration system of claim 2, wherein the first filter element comprises a cylindrical exterior shape and defines a central channel, wherein the second filter element is configured to be disposed within the central channel of first filter element.

4. The filtration system of claim 2, wherein the first filter element comprises an oval exterior shape and does not define a central channel.

5. The filtration system of claim 1, wherein the fluid inlet and the fluid outlet are located adjacent a first end of the housing.

6. The filtration system of claim 5, the housing defining a removable cover connected to a second end of the housing, the second end on the opposite side from the first end of the housing, wherein removal of the cover allows access to an aperture on the housing that is sufficiently large for the first element to pass through.

7. The filtration system of claim 5, wherein the short-range wireless communication reader is disposed adjacent the first end of the housing.

8. The filtration system of claim 6, further comprising a short-range wireless communication tag associated with the removable cover in order to detect cover removal events.

9. The filtration system of claim 8, wherein the short-range wireless communication tag is disposed on or within the removable cover.

10. The filtration system of claim 8, wherein the short-range wireless communication tag is a near-field communication (NFC) tag.

11. The filtration system of claim 8, the system configured to increment and store a count of detected cover removal events or reinstallation events.

12. The filtration system of claim 1, wherein the fluid inlet is located adjacent a first end of the housing, wherein the fluid outlet is located adjacent a second end of the housing, the first end being disposed on an opposite side of the housing as the second end.

13. The filtration system of claim 12, the housing defining a removable cover connected to a first end of the housing, wherein removal of the cover allows access to an aperture on the housing that is sufficiently large for the first element to pass through.

14. The filtration system of claim 12, wherein the reader is disposed adjacent the second end of the housing.

15. The filtration system of claim 1, wherein the maximum communication distance is less than or equal to 8 inches.

16. The filtration system of claim 1, wherein the OFF phase of the ON-OFF-ON pattern has a duration exceeding 0.5 seconds.

17. The filtration system of claim 1, the system configured to increment and store a count of detected filter element removal or reinstallation events.

18. The filtration system of claim 17, the count of detected filter element removal or reinstallation events configured to be stored in a memory circuit that is part of the short-range wireless communication tag disposed on the first filter element.

19. The filtration system of claim 1, wherein information is written to a memory circuit that is part of the short-range wireless communication tag disposed on the first filter element after the system controller identifies an OFF-ON pattern in the electrical signals received from the short-range wireless communication reader, wherein the OFF phase of the pattern corresponds to periods of no communication between the short-range wireless communication tag and the short-range wireless communication reader and the ON phase of the pattern corresponds to periods of communication between the short-range wireless communication tag and the short-range wireless communication reader.

20. The filtration system of claim 1, the system further comprising a latch actuation sensor, the system configured to increment and store a count of latch actuation events.

21. The filtration system of claim 1, the housing comprising a side wall and an end wall, wherein the reader is attached to the side wall.

22. The filtration system of claim 1, the housing comprising a side wall and an end wall, wherein the reader is attached to the end wall.

23. The filtration system of claim 22, wherein the length of the side wall exceeds the maximum communication distance.

24. The filtration system of claim 1, wherein the short-range wireless communication tag is a near-field communication (NFC) tag.

25. The filtration system of claim 1, wherein the short-range wireless communication reader is a near-field communication (NFC) reader.

26. A filtration system comprising:
a housing comprising a fluid inlet and a fluid outlet, the housing defining an internal volume;
a first filter element configured to be removably disposed within the housing;
a short-range wireless communication tag associated with the first filter element;
a short-range wireless communication reader associated with the housing, the reader configured to wirelessly send data to and receive data from the short-range wireless communication tag when the short-range wireless communication reader and the short-range wireless communication tag are at a distance that is less than or equal to a maximum communication distance;
wherein removal of the first filter element from the housing causes movement of the short-range wireless communication tag away from the short-range wireless communication reader by an amount that causes the distance between the short-range wireless communication tag and the short-range wireless communication reader to exceed the maximum communication distance; and
a system controller, the system controller configured to receive electrical signals from the short-range wireless communication reader, the system controller configured to identify patterns in the electrical signals received from the short-range wireless communication reader;
wherein information is written to a memory circuit that is part of the short-range wireless communication tag disposed on the first filter element after the system controller identifies an OFF-ON pattern in the electrical signals received from the short-range wireless communication reader, wherein the OFF phase of the pattern corresponds to periods of no communication between the short-range wireless communication tag and the short-range wireless communication reader and the ON phase of the pattern corresponds to periods of communication between the short-range wireless communication tag and the short-range wireless communication reader.

* * * * *